United States Patent [19]

Pearson et al.

[11] 3,725,531

[45] Apr. 3, 1973

[54] CATALYTIC CONVERSION OF ORGANIC SULFUR COMPONENTS OF INDUSTRIAL OFF-GASES

[75] Inventors: Michael J. Pearson, Pleasanton; Orrie C. Olsen, Walnut Creek; James F. Murphy, Danville, all of Calif.

[73] Assignee: Kaiser Aluminum & Chemical Corporation, Oakland, Calif.

[22] Filed: Feb. 22, 1971

[21] Appl. No.: 117,393

[52] U.S. Cl. ............... 423/244, 423/245, 423/570, 423/576
[51] Int. Cl. .............................................. B01d 53/34
[58] Field of Search ...23/2 S, 3 L, 178 S, 178, 225 P; 423/230, 244, 245, 570, 571, 576, 564, 567

[56] References Cited
UNITED STATES PATENTS 1,771,481 7/1930 Benner et al. ........................... 23/3 L
2,747,968 5/1956 Pigache ................................... 23/2 S

*Primary Examiner*—Earl C. Thomas
*Attorney*—Paul E. Calrow, Harold L. Jenkins and Andrew E. Barlay

[57] ABSTRACT

A process wherein industrial off-gases containing organic sulfur components are contacted with an alumina base catalyst to convert these organic sulfur components to easily removable compounds such as $CO_2$ and S. The catalysts employed comprise an alumina base support in combination with at least one metal selected from strontium, calcium, magnesium, zinc, cadmium, barium and molybdenum employed as promoters. The catalysts have significantly increased service life due to the high resistance to sulfate poisoning.

10 Claims, 1 Drawing Figure

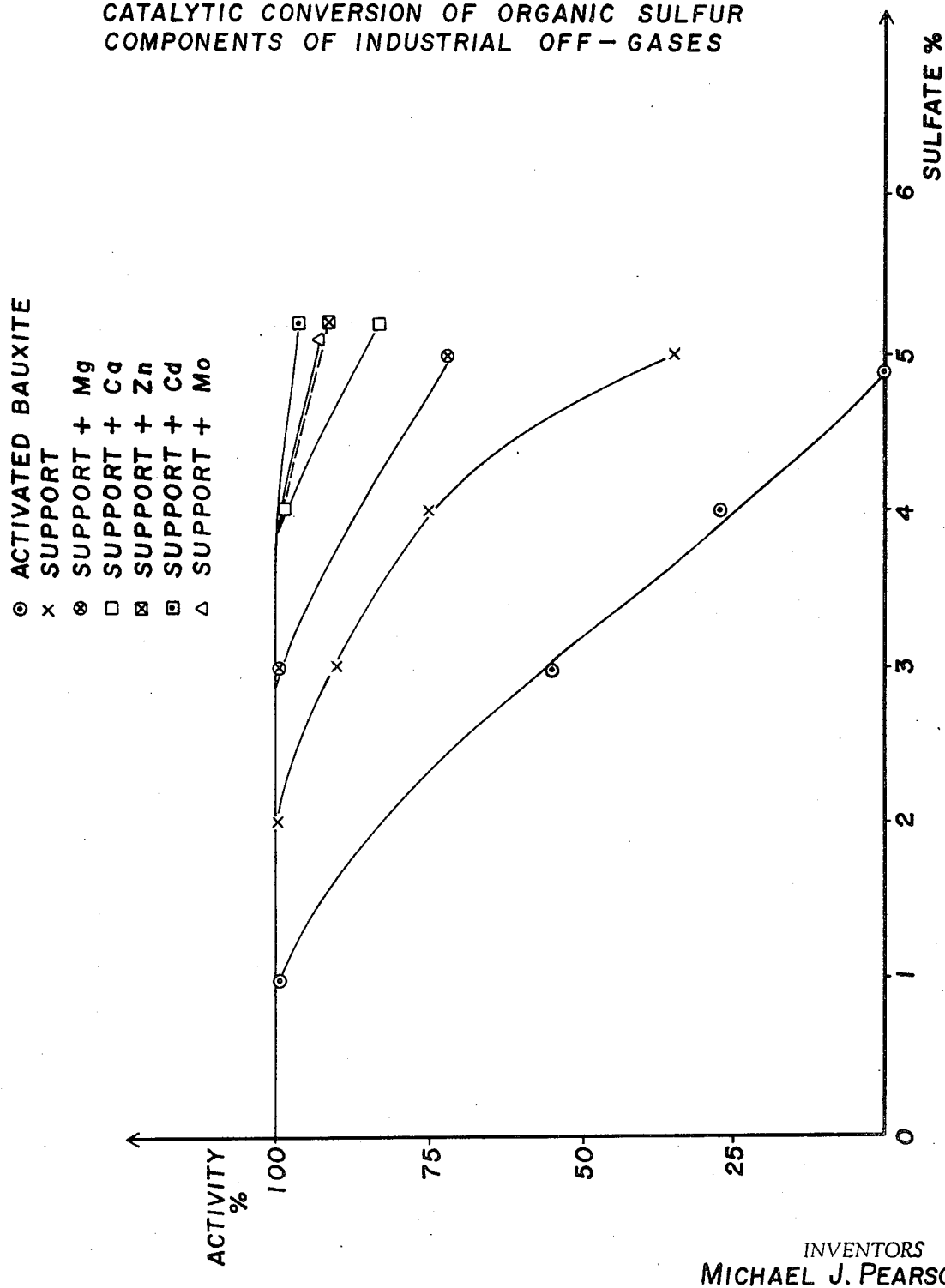

CATALYTIC CONVERSION OF ORGANIC SULFUR COMPONENTS OF INDUSTRIAL OFF-GASES

BACKGROUND OF THE INVENTION

This invention provides an improved process for the catalytic conversion of organic sulfur-containing components present in industrial off-gases. More particularly, it relates to improved alumina base catalysts possessing increased resistance to sulfate poisoning and consequently extended service life when employed for the conversion of organic sulfur contaminants to easily removable compounds.

Many industrial fuels contain sulfur compounds, and prior to utilization, these fuels must be subjected to a "desulfurization" treatment. There are processes which involve the removal of sulfur-containing compounds from sour crudes, such as sour petroleum crudes and sour natural gases. The presence of sulfur-containing compounds renders these crude products unsuitable for most uses due to the toxic nature of these compounds and the corrosive influence they exert upon oxidation. Removal of these sulfur-containing components from petroleum crudes and natural gases is not only important from an economic point of view but also from an ecological standpoint. The sulfur-containing compounds, particularly those present in sour natural gases, when released to the atmosphere may cause pollution problems. Thus, elimination of these sulfur-containing pollutants by conversion to easily removable compounds is of major importance and there have been many suggestions made to accomplish this result.

In general, sour natural gas contains significant quantities of inorganic and organic sulfur compounds. To remove these sulfur-containing contaminants from the natural gas, a so-called "sweetening" process is widely applied which consists of absorption of acidic components, including sulfur-containing compounds in a weakly alkaline solution such as solutions of ethanolamine, potassium carbonate or, for example, Sulfinol (35 percent diisopropanolamine - 40 percent sulfolane - 25 percent water, The Oil and Gas Journal, Jan. 22, 1968). The "sweetened" or "scrubbed" natural gas devoid of sulfur compounds can then be directly employed for well-known uses without the hazards of sulfur pollution, while the absorbent is regenerated by heating it to drive off the dissolved sulfur-containing compounds in gas form. The gas removed from the absorbent is generally rich in hydrogen sulfide, and it also contains significant quantities of mercaptans, polycarbonyl sulfides, together with $CO_2$. In general, this gas is utilized for the production of sulfuric acid by intermediate oxidation of the hydrogen sulfide component or for the production of sulfur by partial oxidation. The off-gases resulting from the partial oxidation treatment usually contain organic sulfur compounds, commonly in the form of $COS$ and $CS_2$, and while the total quantity of these organic sulfur compounds is only in the neighborhood of 1–2 percent, unless they are converted to sulfur and $CO_2$, they build up to significant quantities and cause pollution of the air.

Conversion of these organic sulfur compounds to elemental sulfur and carbon dioxide or hydrogen sulfide is generally accomplished by employing a catalyst capable of catalyzing the decomposition reaction under oxidative conditions. Commonly activated bauxite or activated alumina are utilized in the catalytic conversion of these compounds.

It has been found that during the conversion of these sulfur-containing compounds in the Claus process, there is a gradual build-up of sulfate on the surface of the catalyst. This sulfate is believed to be produced by oxidation of $SO_2$ on the active sites of the bauxite or alumina catalyst employed. This results in accumulation of sulfate on the surface of the catalyst, with consequent reduction in the activity. Reduced activity causes inefficient conversion so that the off-gases will contain excessive quantities of harmful sulfur compounds, which will escape into the air to cause pollution. Additionally, some of the sulfur produced by the catalytic conversion can remain on the surface of the catalyst and during oxidative regeneration needed to remove carbon accumulated in the catalyst surface, will oxidize to sulfate, further decreasing the activity of the catalyst. Thus, regeneration will not in all instances improve performance and frequently results in the formation of additional sulfate on the active sites. This necessitates disposal of the catalyst much sooner than is economically desirable. In addition to economic considerations, catalysts of reduced activity used under the same conversion conditions as fresh catalysts will be unable to convert the sulfur-containing compounds, resulting in pollution. Thus, it is important from both an economical and an ecological standpoint to provide a catalyst for the conversion of organic sulfur-containing compounds that retains its activity for extended periods, even when sulfate deposition occurs.

It has now been discovered that an alumina base support combined with certain promoters exhibits increased resistance to sulfate poisoning, thus providing significantly longer service life than catalysts heretofore employed.

BRIEF SUMMARY OF THE INVENTION

An improved catalyst is provided for the conversion of organic sulfur components of industrial off-gases to easily removable compounds. The catalysts consist of an alumina base support possessing a surface area in excess of about 10 $m^2/g$. The support is combined with at least one promoter selected from calcium, strontium, magnesium, zinc, cadmium, barium and molybdenum wherein the promoter is present in an amount at least about 0.1 percent by weight of the catalyst. The catalytic conversion of the organic sulfur components is accomplished at temperatures between about 100° and 400° C, preferably between about 200° and 400° C, and the improved catalysts provide extended service life and high resistance to sulfate poisoning.

BRIEF DESCRIPTION OF THE DRAWING

The FIGURE shows a comparison between the relative activities of the improved catalysts and prior art catalysts employed for the catalystic conversion of organic sulfur components of industrial off-gases, as a function of sulfate accumulation on their surface.

DETAILED DESCRIPTION OF THE INVENTION

This invention relates to the catalytic conversion of organic sulfur components of industrial off-gases to easily recoverable compounds. More particularly, it concerns the utilization of improved alumina base catalysts resistant to sulfate poisoning for the catalytic conversion of organic sulfur components of industrial off-gases.

Under the term of "industrial off-gas" for the purposes of the present invention, by-product gases are understood which contain organic sulfur components.

The expression "organic sulfur components" refers to organic sulfur compounds represented by the structures of R-S$_2$, R-OS, R-SH and R-S-R, where R is carbon or a hydrocarbon. Typical examples of these compounds include carbonyl sulfide (COS), carbon disulfide (CS$_2$), mercaptans. The term "catalytic conversion" as used herein refers to reactions such as $$COS + H_2O \text{ (vapor)} \rightarrow H_2S + CO_2$$

$$2H_2S + SO_2 \rightarrow 2H_2O + 3S$$

$$CS_2 + O_2 \rightarrow CO_2 + 2S$$

$$2COS + SO_2 \rightarrow 2CO_2 + 3S$$

wherein conversion of the organic sulfur contaminants to CO$_2$, S and/or H$_2$S is accomplished by contact with the improved catalysts of the present invention.

While the well-known Claus process, employed to treat sulfur components removed from sour natural gases, is the main source of off-gases containing these organic sulfur components, the improved catalysts of the present invention can be successfully employed for any desulfurization process where the goal is to convert COS and/or CS$_2$ to CO$_2$ and S or H$_2$S. Thus, for example, the improved catalysts can be used with good results in the desulfurization of crude petroleum hydrocarbons, provided the desulfurization off-gases contain, for example, COS and/or CS$_2$. For simplicity and better understanding, the utilization of the improved catalysts will be described in detail with regard to Claus process off-gases without, however, intending to limit the scope of such utilization to Claus-process off-gases alone.

It has now been surprisingly discovered that alumina base catalysts of increased resistance to sulfate poisoning can be made by combining an alumina base support with promoters acting as antipoisoning agents which are selected from metals such as calcium, magnesium, strontium, barium zinc, cadmium, molybdenum and mixtures thereof. The improved catalysts of the present invention exhibit high activity and consequently increased service life, even with significant accumulation of sulfate on their surface, and thus can be utilized for the conversion of organic sulfur components for significantly longer periods than prior art conversion catalysts.

Any of the well-known activated aluminas can be utilized in the present process for the alumina base support, including activated bauxite. Supports which can be successfully utilized are those which have relatively large surface areas, usually at least 10 and generally between about 50–350 m$^2$/g, as determined by the well-known B.E.T. method. Typical supports include, for example, activated bauxite, activated aluminas possessing an essentially chi-rho structure, calcined Bayer hydrate, calcined gel-derived aluminas containing a substantial portion of pseudoboehmite, gamma alumina and others.

The alumina to be utilized as support for the improved catalysts of the present invention can be either in granular or in shaped form prior to combination with the promoters.

There are several known techniques which allow incorporation of promoters into supports, and these techniques can be successfully employed in the preparation of the improved catalysts. For example, it has been found that spherical activated alumina can be combined with the promoters by impregnation. This involves immersion of the spheres in a solution of the promoter employed in salt form, followed by drying and activation. It is also possible to include the promoters in the support by spraying the surface of the support with a solution of the promoters. Further, it is feasible to employ dry mixtures of the support and the promoters, co-ground to assure uniform distribution. In any event, no matter what type of technique is used to combine the promoters with the support, it is recommended to employ a medthod which provides preferably uniform distribution of the promoters on the support.

The suitable promoters or antipoisoning agents capable of rendering the support highly resistant to deterioration by sulfate poisoning and which act as promoters in the catalytic conversion of organic sulfur components include: magnesium, calcium, strontium, barium, zinc, cadmium and molybdenum. Combinations of these promoters can also be utilized; for example, the support can be simultaneously combined with ions of one or more metals to obtain the improved catalysts of the present invention.

When the combining of the support with the promoter is accomplished by the impregnation technique, the desired metal cation or cations are incorporated with the support by using an aqueous solution of the salt. Thus, for example, if it is desired to incorporate calcium in the support, a water-soluble salt of this metal, such as calcium acetate, is utilized. In general, it was found that the acetate salt of the Group II metals of Ca, Mg, Cd and Zn, besides being water-soluble, decomposes at relatively low temperature to the corresponding oxide well within the temperature range of activation, thus providing a convenient way of incorporation. Naturally, other water-soluble salts of the above recited cations can be equally successfully employed. Molybdenum is usually applied in the form of ammonium molybdate.

The amount of promoter to be combined with the support in order to achieve the desired high activity is usually small. It has been found that promoter quantities as low as 0.1 percent by weight of the catalyst, calculated as metal, provided significant increase in the activity of the catalyst. Particularly good results can be obtained by using about 1 percent by weight or more promoter based on the weight of the catalyst. The upper limit of promoter incorporated into the substrate depends on the economy and, in general, it is selected so as to avoid reduction of the surface area below about 10 m$^2$/g. Promoter concentrations between about 1 percent and about 20 percent, and preferably between 1 and 8 percent, by weight of catalyst were found to be not only economical, but also highly successful in obtaining catalysts possessing increased resistance to sulfate poisoning.

Subsequent to incorporation of the promoters in the support, the catalyst should be dried if impregnation or spraying technique was employed. Drying is accomplished in the temperature range within about 100°–12

0° C in any suitable drying equipment. Subsequent to drying, the catalyst is thermally activated and for the activation, temperatures from about 350° and 700° C were found suitable.

The activated catalysts thus prepared are then suitable to be employed with excellent results as conversion catalysts for organic sulfur component at temperatures between about 100° and 400° C, and preferably between about 200° and 400° C.

The following examples are presented to further illustrate the novel aspects of the present invention and to provide a comparison between the activities of the improved catalysts and also of those employed by the prior art.

EXAMPLE I

Spherical active alumina, characterized by the following properties, was impregnated with various Group II metal salts to provide the improved conversion catalysts.

TABLE I

Characterization of the Alumina Support

| | |
|---|---|
| $Al_2O_3$ content % | 93.6 |
| LOI (Loss on Ignition) % | 6.0 |
| Surface area m²/g | 302 |
| Major phase | chi-rho |

Batches of spherical alumina were immersed in aqueous solutions of calcium acetate, magnesium acetate, cadmium acetate and zinc acetate, for a period of about 2 hours. Each batch was then dried at about 104° C for 2 hours, followed by activation at about 450° C for 1 hour. The loading of the spheres with the promoters was then measured, and the results are shown in Table II.

TABLE II

Loading of Support with Promoters

| Promoter Type | Concentration of Impregnating soln. by wt. % | Promoter (as metal) % by wt. of catalyst |
|---|---|---|
| Ca-acetate | 26 | 3.52 Ca |
| Mg-acetate | 30 | 3.84 Mg |
| Cd-acetate | 17 | 6.40 Cd |
| Zn-acetate | 10 | 2.59 Zn |

Each batch of catalysts described above, together with a control batch of unimpregnated activated bauxite and a control batch of unimpregnated activated alumina support spheres, was then placed into individual heated columns and the columns were treated with a mixture of $SO_2$ and air to provide an atmosphere capable of producing sulfate on the surface of the catalysts. The columns were kept overnight at 500° C to allow accumulation of sulfate on the surface of the catalysts. The catalysts and controls were then subjected to analysis to establish their sulfate content, with the following results:

TABLE III

| System | $SO_4^-$ Content in % by Wt. of Catalyst |
|---|---|
| $Al_2O_3$-Ca | 7.70 |
| $Al_2O_3$-Mg | 5.96 |
| $Al_2O_3$-Cd | 5.00 |
| $Al_2O_3$-Zn | 4.37 |
| Unimpregnated Support | 6.90 |
| Unimpregnated Bauxite | 12.80 |

The conditions established above correspond to a catalyst use of about 2,000–4,000 hours under usual plant conditions and are intended to reproduce the sulfate accumulation expected on the surface of the conversion catalysts after being employed in the Claus process.

Each catalyst batch, including the controls, was then tested for activity in a manner described below. 35 grams of each catalyst and also of the controls were placed in individual reactors (bed thickness 2.4 × 11.0 cm) maintained at about 275° C. A gas composition containing COS 4%, $SO_2$ 2%, $H_2O$ 8%, balance nitrogen (all percentages are volume percent), was conducted through each reactor at a flow rate of 300 cm³/minute and the activity was measured and recorded, the results being shown in Table IV below. (Activity percent is calculated on the basis of volume % COS converted.)

TABLE IV

| Catalyst System | Original activity in % conversion of COS (no $SO_4^-$ on surface) | Activity of $SO_4^-$ containing catalyst in % conversion of COS |
|---|---|---|
| $Al_2O_3$-Ca | 100 | 84.0 |
| $Al_2O_3$-Mg | 100 | 72.0 |
| $Al_2O_3$-Cd | 100 | 96.0 |
| $Al_2O_3$-Zn | 100 | 92.0 |
| Support-control | 100 | 34.0 |
| Bauxite-control | 100 | 0 |

The activities of the improved catalysts and that of the controls were plotted as a function of sulfate accumulation on the surface and are shown in the FIGURE. It can be observed that the activity of bauxite decreases rapidly with accumulation of sulfate on the surface and reaches zero activity at about 5 percent sulfate content on the surface. The unimpregnated activated alumina of essentially chi-rho structure, while markedly better than the activated bauxite, will exhibit about 34 percent activity, i.e., 34 percent of the original activity, when the sulfate content on its surface reaches about 6 percent. In contrast, all of the improved catalysts having about 5–6 percent sulfate on their surface, still exhibit an activity of at least 70 percent of their original activity, thus providing a catalyst of significantly improved activity and service life. The tests were also repeated with a gas mixture containing $CS_2$, and the results obtained corresponded substantially to those obtained with COS as far as the conversion activities were concerned.

EXAMPLE II

The tests described in Example I were repeated by using granular activated bauxite as support. Batches of catalysts were prepared employing the same promoters used in Example I, and the batches were subjected to the sulfate accumulation procedure to obtain a sulfate concentration of about 5 percent on the surface of the control and on the surface of the impregnated catalysts. Following the sulfate accumulation procedure, the catalysts and the control were subjected to the COS conversion test described in Example I, and it has been found that while the control exhibited 0 percent activity, the impregnated catalyst samples, particularly the Ca, Cd, and Zn treated samples, still exhibited economically significant activity, establishing that incorporation of the promoters recited hereinabove increase significantly the resistance of the catalysts against sulfate poisoning.

EXAMPLE III

Compositions containing Group VI and Group VIII metals were also tested to establish their resistance to sulfate poisoning. Thus, individual batches of spherical alumina of the type shown in Table I, were impregnated with solutions of the salts of iron, cobalt, nickel (Group VIII), and chromium (Group VI). The compositions, together with a batch of unimpregnated activated alumina, were then treated with $SO_2$-air in accordance with the procedure described in Example I and their activity was determined. The results are shown in Table V below. In addition, a batch of activated alumina was impregnated with an ammonium molybdate solution (Group VI). This batch was also subjected to the tests described in Example I. The results of these comparison tests indicate the selectivity that exists for certain metals when in an environment where sulfate poisoning occurs.

TABLE V

| Metal | Concentration of Metal in Catalyst % | % Sulfate on surface | Activity in % COS conversion |
|---|---|---|---|
| Iron | 5.35 | 19.7 | 0 |
| Cobalt | 3.86 | 9.64 | 16 |
| Nickel | 3.83 | 19.1 | 0 |
| Chromium | 2.83 | 16.9 | 0 |
| Molybdenum | 8.0 | 4.2 | 90 |

What is claimed is:

1. A process for the catalytic conversion of organic sulfur components of industrial off-gases resulting from the Claus process to carbon dioxide, easily removable inorganic sulfur compounds and elemental sulfur which comprises contacting the off-gases at a temperature between about 100° and 400° C with a catalyst comprising an alumina base support possessing a surface area at least about 10 m²/g and a promoter combined with the support in an amount at least about 1.0 percent by weight of the catalyst, the promoter being selected from at least one metal of the group consisting of calcium, strontium, barium, magnesium, cadmium, zinc, molybdenum and combinations thereof.

2. The process of claim 1, wherein the promoter quantity in the catalyst is from about 1 percent to about 20 percent by weight of the catalyst.

3. The process of claim 1, wherein the contacting is accomplished at a temperature between 200° and 400° C and the surface area of the support is greater than about 50 m²/g.

4. The process of claim 1, wherein the support is a spherical alumina possessing essentially a chi-rho structure.

5. The process of claim 1, wherein the support is an activated bauxite.

6. The process of claim 1, wherein the promoter is zinc.

7. The process of claim 1, wherein the promoter is cadmium.

8. The process of claim 1, wherein the promoter is calcium.

9. The process of claim 1, wherein the promoter is magnesium.

10. The process of claim 1, wherein the promoter is molybdenum.

* * * * *